United States Patent
Zhou et al.

(10) Patent No.: US 10,694,549 B2
(45) Date of Patent: Jun. 23, 2020

(54) WIRELESS COMMUNICATION DEVICES AND BASE STATION FOR WIRELESS COMMUNICATION IN A WIRELESS COMMUNICATION SYSTEM

(71) Applicants: Huawei Technologies Co., Ltd., Shenzhen (CN); FRAUNHOFER-GESELLSCHAFT ZUR FÖRDERUNG DER ANGEWANDTEN FORSCHUNG E.V., Munich (DE)

(72) Inventors: Chan Zhou, Munich (DE); Yunyan Chang, Munich (DE); Peter Jung, Munich (DE); Slawomir Stanczak, Munich (DE)

(73) Assignees: HUAWEI TECHNOLOGIES CO., LTD., Shenzhen (CN); FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 16/133,162

(22) Filed: Sep. 17, 2018

(65) Prior Publication Data
US 2019/0021117 A1    Jan. 17, 2019

Related U.S. Application Data

(63) Continuation of application No. PCT/EP2016/056052, filed on Mar. 18, 2016.

(51) Int. Cl.
*H04W 74/08* (2009.01)
*H04W 72/04* (2009.01)
(Continued)

(52) U.S. Cl.
CPC ........ *H04W 74/0825* (2013.01); *H04W 4/70* (2018.02); *H04W 8/005* (2013.01);
(Continued)

(58) Field of Classification Search
CPC ... H04L 41/12; H04L 67/104; H04L 67/1051; G06F 13/00; G06F 2209/505; G06F 9/5061
See application file for complete search history.

(56) References Cited

U.S. PATENT DOCUMENTS

2008/0091941 A1* 4/2008 Yonezawa ............. H04L 9/3255
                                                   713/158
2012/0155406 A1   6/2012 Kim et al.
(Continued)

FOREIGN PATENT DOCUMENTS

CN     104105072 A    10/2014
EP     2384049 A1     11/2011
(Continued)

OTHER PUBLICATIONS

Alsheikh et al.,"Machine Learning in Wireless Sensor Networks: Algorithms, Strategies, and Applications," IEEE Communications Surveys and Tutorials, vol. 16, No. 4, XP011565128, pp. 1-24, Institute of Electrical and Electronics Engineers, New York, New York (Apr. 24, 2014).
(Continued)

*Primary Examiner* — Ayaz R Sheikh
*Assistant Examiner* — Debebe A Asefa
(74) *Attorney, Agent, or Firm* — Leydig, Voit & Mayer, Ltd.

(57) ABSTRACT

The present disclosure is directed to a wireless communication device for wireless communication in a wireless communication system which comprises a base station and a plurality of wireless communication devices arranged in
(Continued)

clusters, wherein a unique cluster signature is assigned to each cluster and its wireless communication devices, wherein the wireless communication device is allocated to one of said clusters, and comprises receiving means adapted to receive a unique cluster signature assigned to said one cluster from the base station, storing means adapted to store said received unique cluster signature, and transmission means adapted to transmit said unique cluster signature when the wireless communication device switches into an active state, wherein wireless communication device is adapted to access resources on the basis of resource allocation information received in response to the transmission of said unique cluster signature.

20 Claims, 8 Drawing Sheets

(51) Int. Cl.
| H04W 4/70 | (2018.01) |
| H04W 8/00 | (2009.01) |
| H04W 24/10 | (2009.01) |
| H04W 72/06 | (2009.01) |
| H04W 60/00 | (2009.01) |

(52) U.S. Cl.
CPC ....... *H04W 24/10* (2013.01); *H04W 72/0486* (2013.01); *H04W 72/06* (2013.01); *H04W 60/00* (2013.01); *H04W 74/0833* (2013.01)

(56) References Cited

U.S. PATENT DOCUMENTS

2014/0169283 A1* 6/2014 Viorel ................. H04W 74/085
370/329
2015/0282155 A1 10/2015 Webb et al.
2016/0044439 A1 2/2016 Mittal et al.

FOREIGN PATENT DOCUMENTS

WO 2006027933 A1 3/2006
WO 2011087826 A1 7/2011

OTHER PUBLICATIONS

Candes et al.,"Robust Uncertainty Principles: Exact Signal Reconstruction from Highly Incomplete Frequency Information," pp. 1-41 (Aug. 2005).
Charikar et al.,"Finding Frequent Items in Data Streams," International Colloquium on Automata, Languages and Programming, pp. 1-11, Springer, Berlin (Jul. 2002).
Donoho, "Compressed Sensing," IEEE Transactions on Information Theory, vol. 52, No. 4, pp. 1-18, Institute of Electrical and Electronics Engineers, New York, New York (Apr. 2006).
Haupt et al.,"Robust Support Recovery Using Sparse Compressive Sensing Matrices," 2011 45th Annual Conference on Information Sciences and Systems, pp. 1-6, Institute of Electrical and Electronics Engineers, New York, New York (May 12, 2011).
"3rd Generation Partnership Project; Technical Specification Group Radio Access Network; Study on Improvements for Machine-Type Communications (Release 11)", 3GPP TR 37.868 V11.0.0, pp. 1-28, 3rd Generation Partnership Project, Valbonne, France (Sep. 2011).
Schmidt et al.,"Distributed Resource Allocation Schemes," IEEE Signal Processing Magazine, vol. 26, No. 5, pp. 53-63, Institute of Electrical and Electronics Engineers, New York, New York (Sep. 2009).
Candes et al., "Robust Uncertainty Principles: Exact Signal Reconstruction From Highly Incomplete Frequency Information," IEEE Transactions on Information Theory, vol. 52, No. 2, pp. 489-509, Institute of Electrical and Electronics Engineers, New York, New York (Feb. 2006).
Donoho et al, "Stable Recovery of Sparse Overcomplete Representations in the Presence of Noise," IEEE Transactions on Information Theory, vol. 52, No. 1, pp. 6-18, Institute of Electrical and Electronics Engineers, New York, New York (Jan. 2006).
Meng et al., "Sparse Event Detection in Wireless Sensor Networks using Compressive Sensing," 43rd Annual Conference on CISS, pp. 1-5, Sparse Event Detection in Wireless Sensor Networks using Compressive Sensing (Mar. 18-20, 2009).
Schepker et al., "Sparse Multi-User Detection for CDMA Transmission Using Greedy Algorithms," 8th International Symposium on Wireless Communication Systems (ISWCS), pp. 1-5, Institute of Electrical and Electronics Engineers, New York, New York (Nov. 6-9, 2011).
Ling et al, "Decentralized Sparse Signal Recovery for Compressive Sleeping Wireless Sensor Networks," IEEE Transactions on Signal Processing, vol. 58, No. 7, pp. 3816-3827, Institute of Electrical and Electronics Engineers, New York, New York (Jul. 2010).
Tropp et al., "Signal Recovery From Random Measurements via Orthogonal Matching Pursuit," IEEE Transactions on Information Theory, vol. 53, No. 12, pp. 4655-4666, Institute of Electrical and Electronics Engineers, New York, New York (Dec. 2007).
Blumensath et al., "Iterative hard thresholding for compressed sensing," Applied and Computational Harmonic Analysis, vol. 27, No. 3, pp. 265-274, Institute for Digital Communications & the Joint Research Institute for Signal and Image Processing, The University of Edinburgh, UK (May 3, 2009).
Amokrane, "Congestion control in the context of Machine Type Communications in 3GPP LTE Networks," Evolution, Rennes, pp. 1-16 (Jan. 2011).
Jung et al., "Machine-Type-Communication (MTC) Device Grouping Algorithm for Congestion Avoidance of MTC Driented LTE Network," Communications in Computer and Information Science, pp. 1-12, Springer, Berlin, (Mar. 2010).
Sesia et al.,"LTE: The UMTS Long Term Evolution: From Theory to Practice," 2nd Edition, pp. 1-778, John Wiley & Sons, Ltd. (2011).
"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.2.0, pp. 1-33, 3rd Generation Partnership Project, Valbonne, France (May 2008).
EP/16711593.0, Office Action, dated Dec. 19, 2019.

* cited by examiner

Phase 2: Signal Acquisition

Phase 4: Decoding at Devices

Phase 1: Clustering

Phase 3: Decoding at BS

WIRELESS COMMUNICATION DEVICES AND BASE STATION FOR WIRELESS COMMUNICATION IN A WIRELESS COMMUNICATION SYSTEM

CROSS-REFERENCE TO RELATED APPLICATIONS

This application is a continuation of International Application No. PCT/EP2016/056052, filed on Mar. 18, 2016, the disclosure of which is hereby incorporated by reference in its entirety.

TECHNICAL FIELD

The present disclosure relates to wireless communication devices and a base station for wireless communication in a wireless communication system, which comprises a base station and a plurality of wireless communication devices. The disclosure specifically describes a mechanism to detect the resource requests of wireless communication devices and thereafter allocate the radio resources in a wireless network. The disclosure can for example and in particular be applied to large scale machine-to-machine (M2M) communications in a cellular network, including stationary or low-mobility M2M communications for, e.g. Smart Grid and E-Health applications, as well as high-mobility vehicle-to-vehicle (V2V) communication, but is not limited to these applications.

BACKGROUND

Towards the next generation of mobile and wireless networks, machine-type communications (MTC) is expected to play a significant role and form the basis for the future Internet of Things (IoT). M2M communications offer a wide range of applications providing various services, such as the Smart Grid, the E-health system, Vehicle-to-Vehicle (V2V) communications, and etc. In the rest of the present description, all these kinds of wireless communication devices, such as e.g. wireless M2M communication devices are called "devices". With the rapid growth of the M2M market, the number of devices in a wireless communication network can be tremendously increased and can potentially be very large, thus posing significant challenges to current radio access networks.

Once a transmission is triggered by a random event, for instance a malfunction in the power network, the device needs certain wireless resources for its transmission. If a contention-free scheme is applied, a certain amount of dedicated resource blocks will be preserved for the transmissions, and the devices will access those resources in a coordinated manner. However, these kinds of schemes may lead to excessive signaling overhead between the devices and inefficient use of the reserved resource blocks. Moreover, since the wireless resources are in general very limited, those schemes scale poorly with the increasing amount of devices deployed in the network.

Therefore, for devices which need to access the network randomly, they can start with sending a resource request to the network in order to indicate their active status and request for the uplink/sidelink resources for their transmission. A general schematic example of a wireless communication network with a base station (BS) 1 and a plurality of wireless communication devices 2 is shown in FIG. 1. In the example of LTE and LTE-Advance, which is also an example of potential implementation of the disclosure, the random access (RA) procedure comprises four steps as shown in FIG. 2.

Step S1: A device 2 transmits a randomly selected RA preamble sequence on the Physical Random Access Channel (PRACH) to the base station 1.

Step S2: The base station 1 transmits an RA response on the Physical Downlink Shared Channel (PDSCH) in respond to the detected preamble sequence.

Step S3: The device 2 transmits its identity and other messages, e.g., a scheduling request to the base station 1 using the uplink/sidelink resources assigned in the RA response in the second step S2.

Step S4: The base station 1 echoes the device identity it received in the third step on PDSCH.

The base station 1 does not necessarily to be the real entity of a macro/micro base station, but also can be any kind of a central controller for resource allocation and network management. All these functional and/or physical entities which perform the relevant functions are called "base station (BS)" in the rest of the present description of the background as well as the various aspects and embodiments of the present disclosure.

According to the LTE specifications, each cell is assigned a pool of 64 Zadoff-Chu sequences as preambles for the Step S1 transmission. However, a collision will occur if two or more user equipments (UEs), i.e. devices 2, have randomly selected the same preamble. When the number of accessing devices 2 becomes excessively large, the simultaneous access attempts will incur a high probability of collisions in the first step of the random access, since the number of preambles and the Random Access Channel (RACH) resources are quite limited. Hence, the RA procedure scales poorly with the increasing number of devices 2 in the network and the network will easily become overloaded and congested, leading to high detection failure rate and large access delays.

The massive deployment of devices in the MTC network poses significant challenges to the current radio network in term of device detection and resource allocation, especially when the devices access the network randomly. Seamless coordination and excessive information exchange between the devices are required by conventional access schemes to mitigate collisions in the random access channel, which leads to immoderate signaling overhead.

The object of the present disclosure is therefore to propose a mechanism, and specifically wireless communication devices, a base station and a method for resource allocation for a wireless communication network comprising a plurality of wireless communication devices and a base station, in which the signaling overhead for resource allocation is reduced and a faster and more efficient resource access is provided.

SUMMARY

This object is solved by a wireless communication device according to claim 1, a wireless communication device according to claim 7, a base station according to claim 10, a wireless communication system according to claim 15 and a method for resource allocation according to claim 16. Further advantageous features are defined in the respective dependent claims.

In a first aspect of the disclosure a wireless communication device for wireless communication in a wireless communication system which comprises a base station and a plurality of wireless communication devices arranged in clusters is provided, wherein a unique cluster signature is assigned to each cluster and its wireless communication devices, wherein the wireless communication device is allocated to one of said clusters and comprises receiving means adapted to receive a unique cluster signature assigned to said one cluster from the base station, storing means adapted to store said received unique cluster signature, and transmission means adapted to transmit said unique cluster signature when the wireless communication device switches into an active state, wherein wireless communication device is adapted to access resources on the basis of resource allocation information received in response to the transmission of said unique cluster signature. The unique cluster signature which is transmitted from said active wireless communication device can either be transmitted to and received by the respective base station and other active wireless communication devices in said one cluster (in the example of a full-duplex case as explained later), or by the respective base station and one or more head wireless communication device(s) in said one cluster (in the example of a half-duplex case as explained later).

The wireless communication device according to the first aspect as defined above thus solves the object of the present disclosure in an advantageous way and provides a reduced signaling overhead for resource allocation and a faster and more efficient resource access in the wireless communication system. These advantages as well as the further advantages identically apply to the various further aspects of the disclosure as defined below. Specific advantages are then achieved by the various implementation forms of the respective aspects of the disclosure as defined below.

Since the devices in the system are partitioned into clusters, a balk of requests from the devices can be handled in a single shot. Since the behaviors are in general highly correlated among the devices, e.g., due to proximity, the same service type, and etc. Thus, it is reasonable to cluster the devices according to some of these criteria, where the correlation in the device behaviors is exploited for more efficient device detection and resource allocation schemes. In addition, since the MTC traffic is characterized by the sporadic communication among a huge number of devices, each device has a low probability of being active, thus exhibiting a certain level of sparsity in the device detection process.

The disclosure further uses compressed sensing (CS) techniques, which are a proper paradigm to deal with high-dimensional signals with a sparse representation. It is an emerging signal processing technique where the signal acquisitions are done in a significantly reduced sampling rate, thus the computational complexity is significantly reduced. Recognizing the large-scale M2M network and the sparsity in the activation pattern among the devices, the device detection process can be formulated as a signal recovery procedure of a high-dimensional sparse signal by the CS principles. Moreover, observing the cluster-like behavior among the devices, the activation pattern of the devices can be formulated as a particular block sparse signal—with additional in-block structure—in CS based applications. Thus the device detection process can be mapped into the recovery procedure of such a sparse signal.

In order to cope well with the tremendous scaling issues due to massive connectivity in large-scale M2M networks and to tackle the excessive signaling overhead among the devices, distributed schemes are applied to the present disclosure, where each device determines its resource allocation autonomously. The distributed schemes call for much less coordination and information exchange between the devices, thus the signaling overhead can be substantially reduced and adapted according to the size of the network. Therefore, the distributed schemes in general achieve better scalability with the increasing number of devices in the network, which is an attractive property for large-scale networks.

Therefore, this disclosure suggests a distributed detection scheme of the network activation pattern based on CS techniques to facilitate efficient resource allocation strategies for large-scale M2M communications. This disclosure targets to cope with tremendous scaling issues aroused by the MTC network, especially for enhanced device detection probability and reduced access delay.

The present disclosure utilizes the framework of compressed sensing for distributed device detection and resource allocation in large-scale M2M communication networks. The devices deployed in the network are partitioned into clusters according to some pre-defined criteria. And the devices in each of the clusters are assigned a unique cluster signature of a particular design that can be used to indicate their active status to the network. By exploiting the sparsity in the activation pattern of the devices, the device detection problem is tackled as a support recovery procedure for a block-sparse signal in the CS based applications. Compared with conventional schemes like LTE RA procedure and classic cluster-based access approaches, this disclosure achieves better scalability with the network size and sufficiently reduces the computational complexity as well as the signaling overhead, thus leading to more robust performance in the detection process, especially in terms of higher detection probability and reduced access delay.

In a first implementation form of the first aspect the receiving means is further adapted to receive, together with the unique cluster signature, additional information from the base station, wherein the additional information includes cluster identification identifying said cluster, device identification identifying the devices in said cluster and ranking information regarding the resource access ranking of the devices in said one cluster.

In a second implementation form according to the first implementation form of the first aspect the receiving means is further adapted to receive said resource allocation information issued in response to the received unique cluster signature from said base station, wherein said resource allocation information comprises information regarding a total amount of resources allocated for all the active wireless communication devices in said one cluster, and further comprising control means adapted to determine the specific resources to be accessed on the basis of said received resource allocation information and said received additional information.

In a third implementation form according to the second implementation form of the first aspect the receiving means is further adapted to receive, together with said resource allocation information, the number of active devices in said cluster and collision patterns from the base station, and the control means is further adapted to determine said specific resources to be accessed on the basis of the received resource allocation information, the received number of active devices in said cluster and the received collision patterns as well as said additional information.

In a fourth implementation form according to the third implementation form of the first aspect the receiving means is further adapted to simultaneously receive unique cluster signatures from other active wireless communication devices in said one cluster, and wherein the control means is adapted to identify other active devices in said cluster on the basis of the received number of active devices in said cluster and the received collision patterns as well as the previously received device identification and unique cluster signatures from other active wireless communication devices in said one cluster.

In a fifth implementation form of the first aspect as such or according to the first implementation form of the first aspect the receiving means is further adapted to receive, together with the unique cluster signature, cluster head information from the base station, said cluster head information identifying a wireless communication device in said one cluster as head communication device, wherein the receiving means is further adapted to receive said resource allocation information from said head communication device; wherein the received resource allocation information comprises specific information about the resources to be accessed.

In a second aspect of the disclosure a wireless communication device for wireless communication in a wireless communication system which comprises a base station and a plurality of wireless communication devices arranged in clusters is provided, wherein a unique cluster signature is assigned to each cluster and its wireless communication devices, wherein the wireless communication device is allocated to one of said clusters as ahead communication device and comprises receiving means to receive a unique cluster signature assigned to said one cluster and cluster head information from the base station, said cluster head information identifying the wireless communication device in said one cluster as said head communication device, control means adapted to generate resource allocation information in response to unique cluster signatures received from active wireless communication devices in said one cluster, and transmitting means adapted to transmit said resource allocation information to said active wireless communication devices in said one cluster.

In a first implementation form of the second aspect said receiving means is further adapted to receive, together with the unique cluster signature, additional information from the base station, wherein the additional information includes cluster identification identifying said cluster, device identification identifying the wireless communication devices in said one cluster and ranking information regarding the resource access ranking of the wireless communication devices in said one cluster.

In a second implementation form of the second aspect said receiving means is further adapted to simultaneously receive unique cluster signatures from respective active wireless communication devices in said one cluster, and to receive resource allocation information comprising information regarding the total amount of resources allocated to said active wireless communication devices in said one cluster, the number of active devices in said cluster and collision patterns from said base station, wherein the control means is further adapted to identify active wireless communication devices in said one cluster on the basis of the received unique cluster signatures, the received number of active devices in said one cluster and the received collision patterns as well as the previously received device identification, and to allocate specific resources to the identified active wireless communication devices in said one cluster on the basis of the received resource allocation information and the previously received ranking information from said base station, and the transmitting means is further adapted to transmit specific resource allocation information regarding the specific allocated resources to the identified active wireless communication devices in said one cluster.

In a third aspect of the disclosure a base station for wireless communication in a wireless communication system which comprises the base station and a plurality of wireless communication devices arranged in clusters is provided, wherein the base station comprises control means to adapted to generate and allocate a unique cluster signature to each of the clusters and its respective wireless communication devices, and transmitting means adapted to transmit the generated and allocated unique cluster signatures to the plurality of wireless communication devices.

In a first implementation form of the third aspect the transmitting means is further adapted to transmit, together with the unique cluster signature, additional information to the plurality of wireless communication devices, wherein the additional information includes cluster identification identifying said clusters, device identification identifying the wireless communication devices in said clusters and ranking information regarding the resource access ranking of the wireless communication devices in said clusters.

In a second implementation form of the third aspect as such or according to the first implementation form of the third aspect the base station comprises receiving means adapted to simultaneously receive unique cluster signatures from respective wireless communication devices, wherein the control means is further adapted to determine, on the basis of the received unique cluster signatures, active clusters, the number of active devices in each active cluster, and collision patterns with collision information regarding the interference of the received unique cluster signatures, and to allocate a total amount of resources for all active wireless communication devices in each of the active clusters, the transmitting means is further adapted to transmit resource allocation information regarding the allocated resources, the number of active devices in each active cluster and the collision patterns, wherein the resource allocation information comprises information regarding said total amount of resources for the active wireless communication devices in each of the active clusters.

In a third implementation form of the third aspect the transmitting means is adapted to transmit the resource allocation information, the number of active devices in each active cluster and the collision patterns to the active wireless communication devices in a broadcast transmission, or the transmitting means is adapted to transmit the resource allocation information, the number of active devices in each active cluster and the collision patterns to the active wireless communication devices together with cluster identification identifying the active clusters in a multicast transmission.

In a fourth implementation form of the third aspect one wireless communication device in each cluster is allocated as head communication device to said cluster, wherein said transmitting means is further adapted to transmit, together with said unique cluster signatures, cluster head information to said one head communication device in each cluster, and said transmitting means is further adapted to transmit the resource allocation information, the number of active devices in each active cluster and the collision patterns to the head communication devices in each active cluster.

In a fourth aspect of the disclosure a wireless communication system is provided comprising a plurality of wireless communication devices according to the first aspect as such or according to one of the first to fifth implementation forms of the first aspect and a base station according to the third aspect as such or according to one of the first to fourth implementation forms of the third aspect, or a plurality of wireless communication devices according to the first aspect as such or according to the first or the fifth implementation form of the first aspect, wireless communication devices according to the second aspect as such or according to the first or the second implementation form of the second aspect and a base station according to the third aspect as such or according to one of the first to fourth implementation forms of the third aspect.

In a fifth aspect of the disclosure a method for resource allocation in a wireless communication system which comprises a base station and a plurality of wireless communication devices arranged in clusters is provided, wherein the base station generates and allocates a unique cluster signature to each of the clusters and its respective wireless communication devices and transmits the generated and allocated unique cluster signatures to the plurality of wireless communication devices, and each wireless communication device stores a received unique cluster signature of the cluster to which it is allocated, transmits the unique cluster signature when the communication device switches into an active state, receives resource allocation information and accesses resources on the basis of the received resource allocation information. The unique cluster signature which is transmitted from said active wireless communication device can either be transmitted to and received by the respective base station and other active wireless communication devices in said one cluster (in the example of a full-duplex case as explained later), or by the respective base station and one or more head wireless communication device(s) in said one cluster (in the example of a half-duplex case as explained later).

In a first implementation form of the fifth aspect the receiving step further comprises receiving, together with the unique cluster signature, additional information from the base station, wherein the additional information includes cluster identification identifying said cluster, device identification identifying the devices in said cluster and ranking information regarding the resource access ranking of the devices in said one cluster.

In a second implementation form according to the first implementation form of the fifth aspect the receiving step further comprises receiving said resource allocation information issued in response to the received unique cluster signature from said base station, wherein said resource allocation information comprises information regarding a total amount of resources allocated for all the active wireless communication devices in said one cluster, and further comprising a control step to determine the specific resources to be accessed on the basis of said received resource allocation information and said received additional information.

In a third implementation form according to the second implementation form of the fifth aspect the receiving step further comprises receiving, together with said resource allocation information, the number of active devices in said cluster and collision patterns from the base station, and the control step further comprises determining said specific resources to be accessed on the basis of the received resource allocation information, the received number of active devices in said cluster and the received collision patterns as well as said additional information.

In a fourth implementation form according to the third implementation form of the fifth aspect the receiving step further comprises simultaneously receiving unique cluster signatures from other active wireless communication devices in said one cluster, and wherein the control step comprises identifying other active devices in said cluster on the basis of the received number of active devices in said cluster and the received collision patterns as well as the previously received device identification and unique cluster signatures from other active wireless communication devices in said one cluster.

In a fifth implementation form of the fifth aspect as such or according to the first implementation form of the fifth aspect the receiving step further comprises receiving, together with the unique cluster signature, cluster head information from the base station, said cluster head information identifying a wireless communication device in said one cluster as head communication device, wherein the receiving step further comprises receiving said resource allocation information from said head communication device; wherein the received resource allocation information comprises specific information about the resources to be accessed.

In a sixth aspect of the disclosure a method for resource allocation in a wireless communication system which comprises a base station and a plurality of wireless communication devices arranged in clusters is provided, wherein said base station assigns a unique cluster signature to each cluster and its wireless communication devices, wherein the bases station allocates a wireless communication device to one of said clusters as a head communication device and wherein the head communication device receives a unique cluster signature assigned to said one cluster and cluster head information from the base station, said cluster head information identifying the wireless communication device in said one cluster as said head communication device, and performs a control step to generate resource allocation information in response to unique cluster signatures received from active wireless communication devices in said one cluster, and transmits said resource allocation information to said active wireless communication devices in said one cluster.

In a first implementation form of the sixth aspect said receiving step further comprises receiving, together with the unique cluster signature, additional information from the base station, wherein the additional information includes cluster identification identifying said cluster, device identification identifying the wireless communication devices in said one cluster and ranking information regarding the resource access ranking of the wireless communication devices in said one cluster.

In a second implementation form of the sixth aspect said receiving step further comprises simultaneously receiving unique cluster signatures from respective active wireless communication devices in said one cluster, and receiving resource allocation information comprising information regarding the total amount of resources allocated to said active wireless communication devices in said one cluster, the number of active devices in said cluster and collision patterns from said base station, wherein the control step further comprises identifying active wireless communication devices in said one cluster on the basis of the received unique cluster signatures, the received number of active devices in said one cluster and the received collision patterns as well as the previously received device identification, and allocating specific resources to the identified active wireless communication devices in said one cluster on the basis of the received resource allocation information and the previously received ranking information from said base station, and the transmitting step further comprises transmitting specific resource allocation information regarding the specific allocated resources to the identified active wireless communication devices in said one cluster.

In a seventh aspect of the disclosure a method for resource allocation in a wireless communication system which comprises the base station and a plurality of wireless communication devices arranged in clusters is provided, wherein the base station performs a control step to generate and allocate a unique cluster signature to each of the clusters and its respective wireless communication devices, and transmits the generated and allocated unique cluster signatures to the plurality of wireless communication devices.

In a first implementation form of the seventh aspect the transmitting step further comprises transmitting, together with the unique cluster signature, additional information to the plurality of wireless communication devices, wherein the additional information includes cluster identification identifying said clusters, device identification identifying the wireless communication devices in said clusters and ranking information regarding the resource access ranking of the wireless communication devices in said clusters.

In a second implementation form of the seventh aspect as such or according to the first implementation form of the seventh aspect the base station simultaneously receives unique cluster signatures from respective wireless communication devices, wherein the control step further comprises determining, on the basis of the received unique cluster signatures, active clusters, the number of active devices in each active cluster, and collision patterns with collision information regarding the interference of the received unique cluster signatures, and allocating a total amount of resources for all active wireless communication devices in each of the active clusters, the transmitting step further comprises transmitting resource allocation information regarding the allocated resources, the number of active devices in each active cluster and the collision patterns, wherein the resource allocation information comprises information regarding said total amount of resources for the active wireless communication devices in each of the active clusters.

In a third implementation form of the seventh aspect the transmitting step comprises transmitting the resource allocation information, the number of active devices in each active cluster and the collision patterns to the active wireless communication devices in a broadcast transmission, or the transmitting step comprises transmitting the resource allocation information, the number of active devices in each active cluster and the collision patterns to the active wireless communication devices together with cluster identification identifying the active clusters in a multicast transmission.

In a fourth implementation form of the seventh aspect one wireless communication device in each cluster is allocated as head communication device to said cluster, wherein said transmitting step further comprises transmitting, together with said unique cluster signatures, cluster head information to said one head communication device in each cluster, and said transmitting step further comprises transmitting the resource allocation information, the number of active devices in each active cluster and the collision patterns to the head communication devices in each active cluster.

Generally, it has to be noted that all wireless communication devices, base stations and their respective means, units and functionalities as defined in the claims as well as in the following embodiments can be implemented by software or hardware elements or any kind of combination thereof. Furthermore, the functionalities of the wireless communication devices and base stations may be implemented by processors or may comprise processors. All steps which are performed by the various entities described in the present description as well as the functionalities described to be performed by the various entities are intended to mean that the respective entity is adapted to or configured to perform the respective functionalities and steps. Even if in the following description of specific embodiments, a specific functionality or step to be performed by a general entity is not reflected in the description of a specific detailed element of the entity which performs that specific step or functionality, it should be clear for a skilled person that these methods and functionalities can be implemented in respect of software or hardware elements, or any kind of combination thereof.

BRIEF DESCRIPTION OF DRAWINGS

The present disclosure is in the following explained in detail in relation to embodiments of the disclosure in reference to the enclosed drawings, in which.

In the Figures identical reference signs are used for identical or at least functionally equivalent features.

DETAILED DESCRIPTION

Figure 3B:
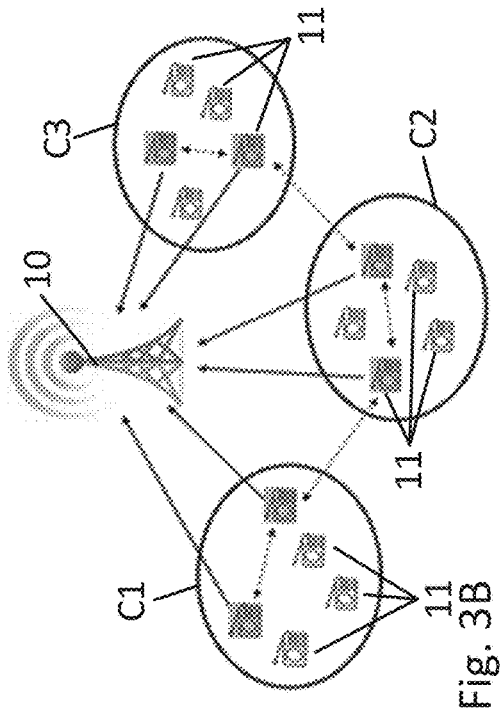
FIG. 3A, FIG. 3B, FIG. 3C, FIG. 3D show schematic examples of scenarios with different phases performed by the present disclosure.
Figure 3D:
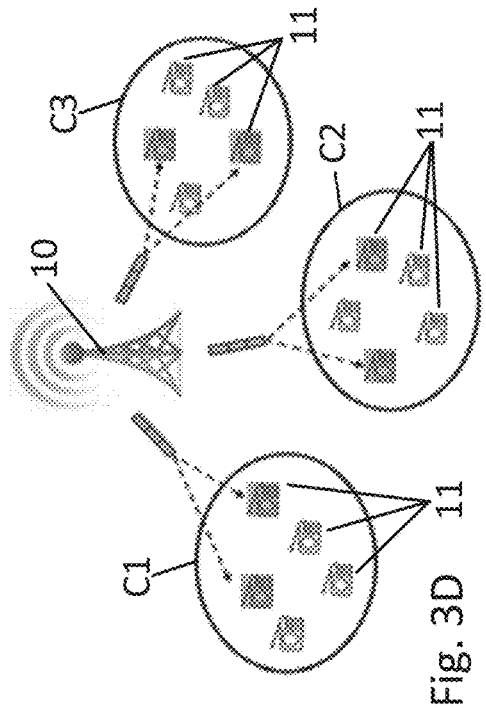
Figure 3A:
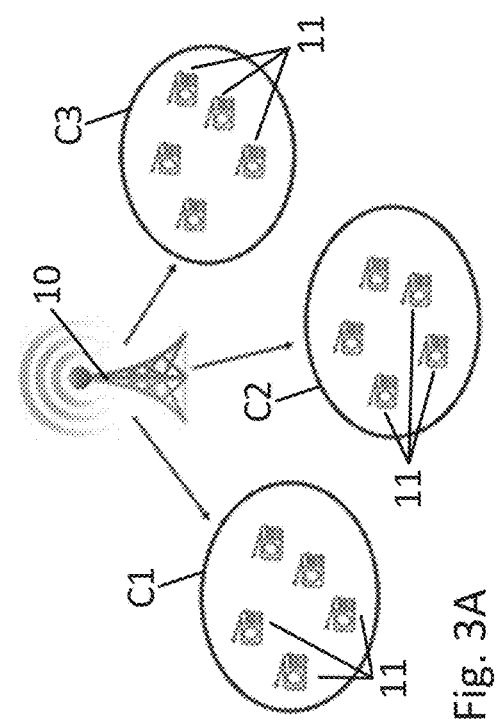
Figure 3C:
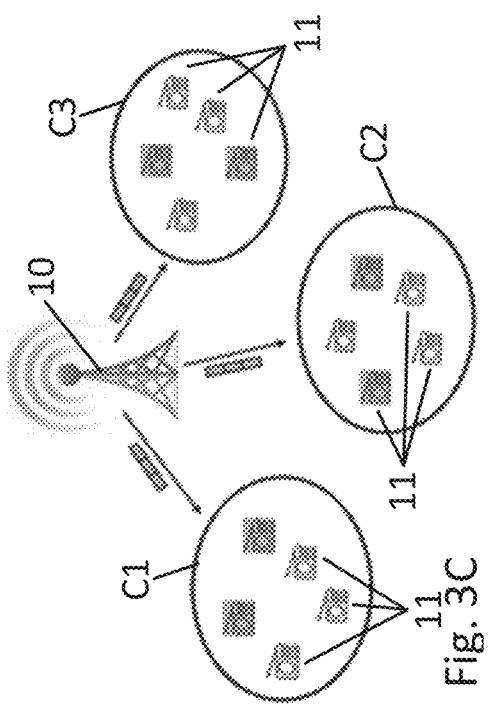

As stated above in the summary, the present disclosure is directed to a wireless communication system which comprises a base station 10 and a plurality of wireless communication devices 11 which are arranged in clusters C1, C2 and C3. A schematic example is shown in FIG. 3A. FIGS. 3B, 3C and 3D show further scenarios of the various communication and processing phases performed by the base station 10 and the wireless communication devices 11 according to the present disclosure. A wireless communication device 11 of the present disclosure is defined according to the first aspect and its various implementation forms as defined above. A base station 10 according to the present disclosure is defined in the third aspect and its implementation forms as defined above. The optional example of a wireless communication device 12 designated as a head communication device is defined in the second aspect and its implementation forms as defined above. Such a head communication device could be a wireless communication device 11 with its respectively defined functionalities and comprise the additional functionalities of the head communication device as described, or the head communication device could be a wireless communication device which only comprises and performs the head communication device functionalities as described.

Figure 1:
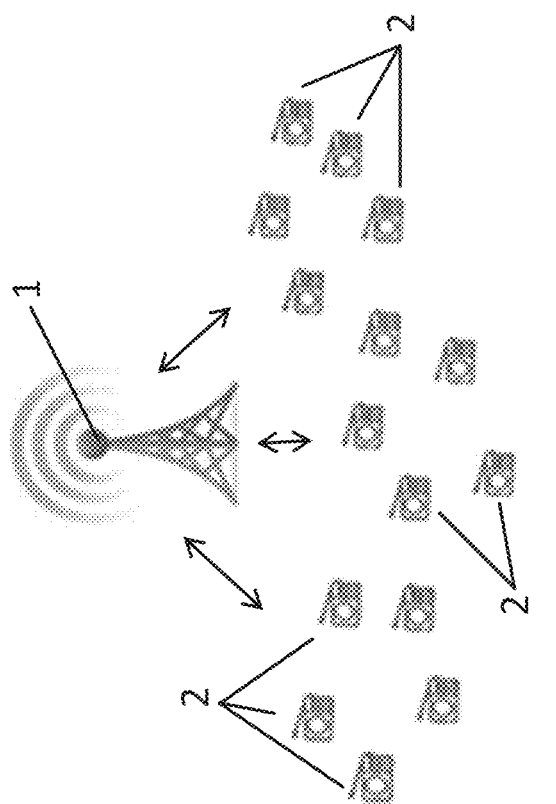
FIG. 1 shows a schematic example of a wireless communication system comprising a base station and a plurality of wireless communication devices.
Figure 2:
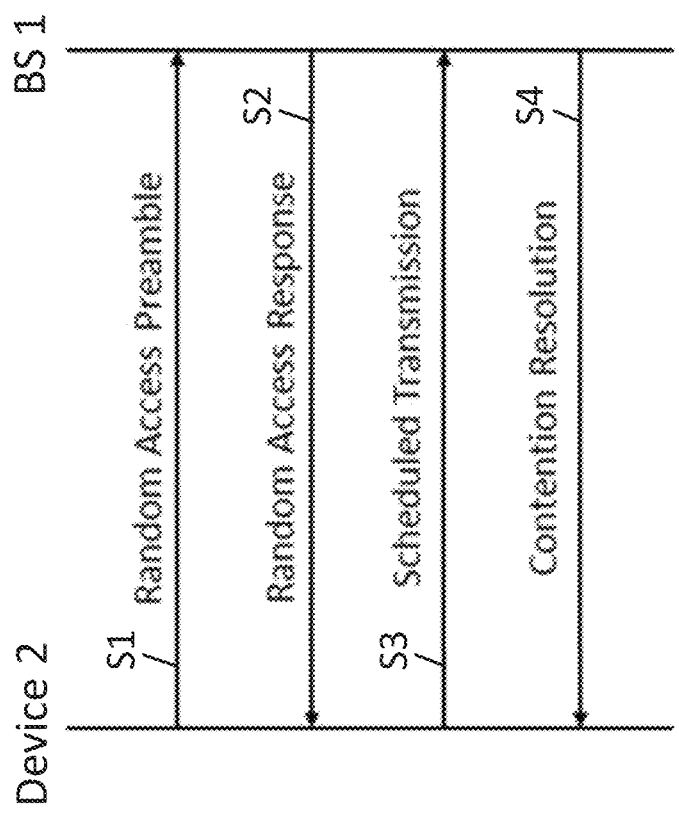
FIG. 2 shows a general example of a random access procedure.
Figure 6:
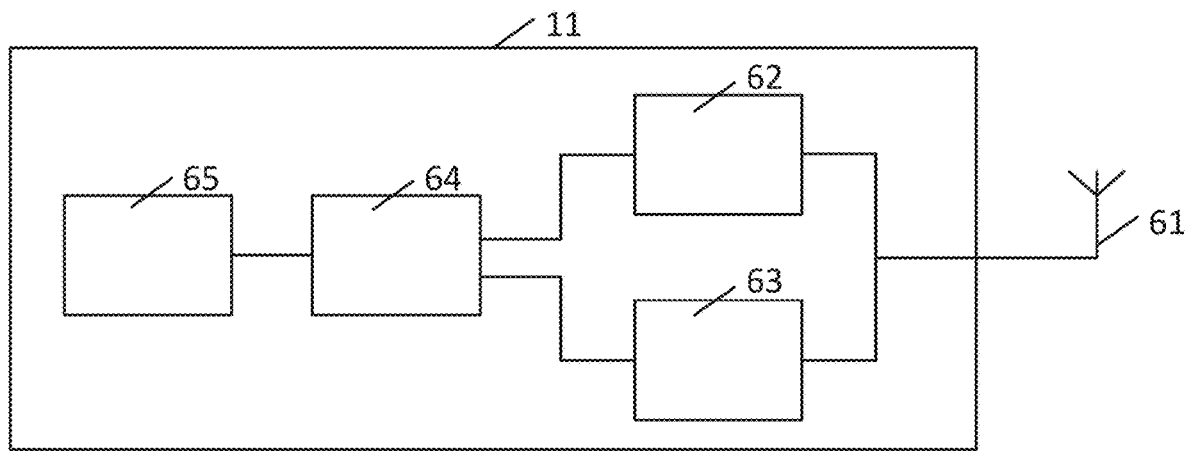
FIG. 6 shows a schematic example of a wireless communication device of the present disclosure
Figure 7:
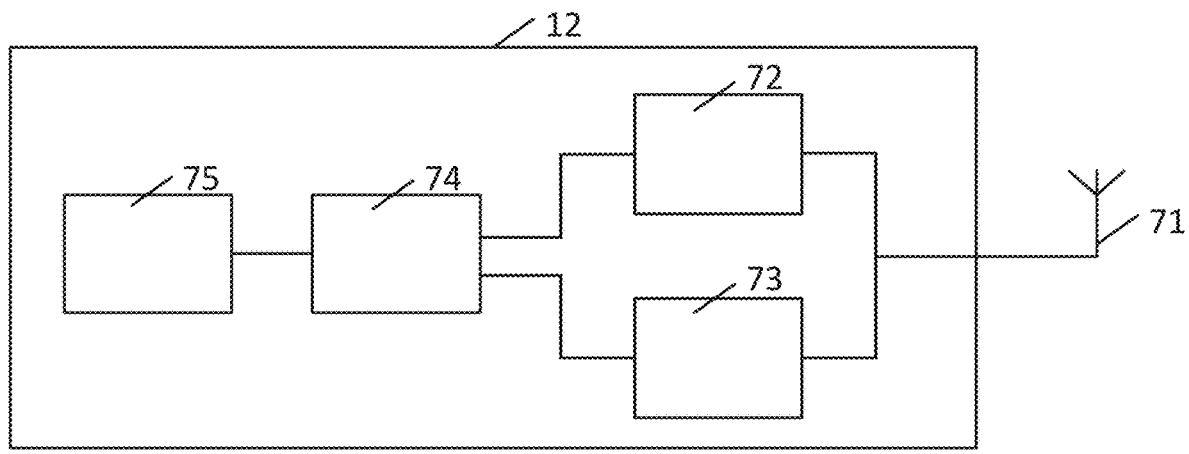
FIG. 7 shows a schematic example of a head communication device according to the present disclosure.
Figure 8:
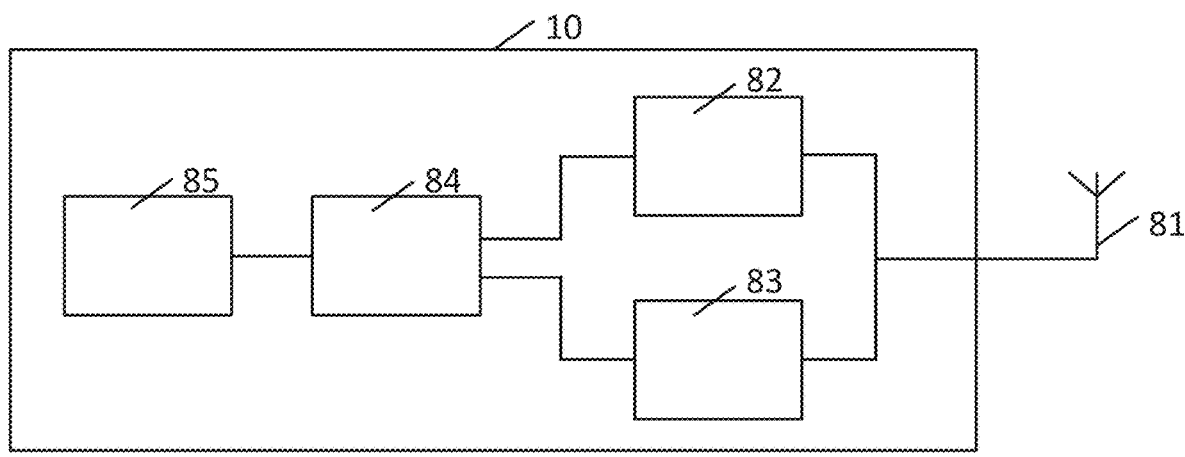
FIG. 8 shows a schematic example of a base station according to the present disclosure.

It has to be further understood that the base station 10 according to the present disclosure comprises the functionalities of a base station 1 as explained in the background part. Similarly, the wireless communication devices 11 of the present disclosure comprise the functionalities of wireless communication devices 2 as described in the background part. Also, the flow chart of the random access procedure shown in FIG. 2 is identically applicable and implemented into the base station 10 and the wireless communication devices 11 of the present disclosure. Consequently, the schematic block diagram of the wireless communication device 11 according to the present disclosure as shown in FIG. 6, the schematic block diagram of a head communication device 12 of the present disclosure, shown in FIG. 7 and the schematic block diagram of a base station 10 of the present disclosure as shown in FIG. 8 only show and describe functionalities which are relevant for implementing the functionalities according to the present disclosure. Additional functionalities which need to be present in order to unable the corresponding communication and processing in the respective wireless communication system apart of the common knowledge of the skilled person and are not specifically described. Thus, the wireless communication device 11 is shown in FIG. 6 comprises an antenna 61 to receive and transmit signals in the wireless communication system, as well as receiving means 62 and transmitting means 63 respectively adapted to perform the necessary receiving and transmitting functionalities in cooperation with the antenna 61. The general processing and controlling functions are performed in a control means 64 which is connected to the receiving means 62 and the transmitting means 63. Further, a storage means 65 is connected to the control means 64 in order to store the necessary information and signals. Similarly, the head communication device 12 is shown in FIG. 7 comprises an antenna 71 to transmit and receive signals and a wireless communication system, as well as receiving means 72 and transmitting means 73 for respectively performing receiving and transmitting functionalities in cooperation with the antenna 71. Further, a control means 74 which is connected to a storage means 75 is provided, wherein the control means 74 is adapted to perform the necessary processing functionalities is described in more detail below, and is connected to the receiving means 72 and the transmitting means 73. The base station 10 shown in FIG. 8 comprises an antenna 81 for transmitting and receiving signals in the wireless communication system, which is connected to a receiving means 82 and a transmitting means 83 adapted to respectively perform the required receiving and transmitting functionalities in cooperation with the antenna 81. A control means 84 is adapted to perform the necessary processing functionalities in cooperation with a storage means 85 adapted to store the required signals and information. The control means 84 is generally connected to the receiving means 82 and the transmitting means 83. Generally, the receiving means 62, 72, 82 of the wireless communication device 11, the head communication device 12 and the base station 10 are adapted to perform the respectively described and defined receiving functionalities. The transmitting means 63, 73, 83 of the wireless communication device 11, the head communication device 12 and the base station 10 are adapted to perform the respectively described and defined transmitting functionalities. The control means 64, 74, 84 of the wireless communication device 11, head communication device 12 and base station 10 are adapted to perform all described processing, controlling, generating, allocating and so forth functionalities described in the present description and defined in the various claims for the respectively received information or the respectively to be transmitted information. The storage means 65, 75 and 85 respectively store the received information or to be transmitted information in cooperation with the respective control means 64, 74, and 84.

According to the disclosure, the devices 11 are partitioned into clusters C1, C2, C3, thus a balk of similar requests can be handled in a single shot. Since the devices 11 in general exhibit highly correlated behaviors, e.g., due to proximity, the same service type, and etc., it is reasonable to cluster the devices 11 according to some of these criteria. And a device 11 can be assorted into multiple clusters C1, C2, C3 on different features. For example, a temperature sensor in a building can be clustered for the building temperature management, but can also be a member in the fire alarm system. The cluster structures are known both at the BS 10 and at the devices 11 during the device registration process to the network and updated periodically.

Moreover, since the MTC traffic is characterized by the sporadic communication among a huge number of devices 11, each device 11 has a low probability of being active, thus exhibiting a certain level of sparsity in the detection activity.

For example in an E-health system a patient has multiple measurement devices 11 attached to his/her body to keep track of his/her health conditions. These devices 11 include sensors measuring the body temperature, blood pressure, heart rate and etc. Therefore, it is reasonable to assort these devices 11 into the same cluster C1 or C2 or C3. However, at a certain time instant, only a small number of patients observe abnormal symptoms in the hospital. In this case, several sensors, i.e. devices 11 attached to the patient become triggered and start accessing the network to report their status, such as the heart rate sensor and the blood pressure sensor. A cluster C1, C2, C3 is called "active" if one or more devices 11 from the cluster are active. Therefore, in general at a certain time instant, only several clusters become active and only a small number of the devices 11 in those active clusters are triggered to report to the network. Thus, a twofold sparsity pattern, namely the block sparsity and in-block sparsity, can be defined to model the active status of the devices 11. Hereby, Block Sparsity means that only several of the clusters C1, C2 or C3 become active at a certain time instant, and In-block Sparsity means that only several devices from the same cluster C1, C2 or C3 are active.

In addition, both the BS 10 and each device 11 in the network also has the (estimated) channel information from other devices 11 to itself, which is required in the algorithms for device detection of the disclosure. The channel information can be obtained via statistical channel knowledge, location-based estimation or long-term observation, and will be stored in the storage means 75 of each device 11 and in the storage means 85 of the BS 10.

In addition, a ranking among the devices 11 in each cluster C1, C2, C3 is conducted in advance in order to determine the order for the active devices to access the assigned resource blocks by the BS 10. As a result, the active devices access the corresponding resources according to their ranking in the cluster. For instance, 2 resource blocks are assigned to a particular cluster C1, C2, C3 where 2 devices 11 in the cluster C1, C2 or C3 are active. Then the active device with a higher ranking will access the first resource block for transmission and the device with a lower ranking will take the second resource block. The devices 11 can be ranked according to some pre-defined rule, e.g., the order of the device identification ID, service priority, and etc. And the ranking information is also informed to the devices in advance by the BS 10, and will be stored in the storage means 75 of each device 11.

In this disclosure, the devices 11 in each of the clusters C1, C2, C3 are assigned a unique cluster signature, which is also called unique compressed signature or simply signature in the present description and used to indicate their active status to the network, the design of which is different from the preambles (Zadoff-Chu sequences) in the LTE RA procedure and will be introduced in detail in below in the section "Signature Design", i.e. is unique for this cluster in the network (system). Each of the compressed signatures indicates the membership to a particular cluster, and is informed to the devices 11 in the corresponding cluster C1, C2, C3 during the device registration phase as well, and will be stored in the storage means 75 of each device 11. Furthermore, the particular design of the compressed signatures can also indicate other properties of the cluster if needed, such as the amount of resource blocks requested by each device 11 in the cluster.

A full-duplex system allows data to be transmitted in both communication directions at the same time, which means the signals can be transmitted and received simultaneously, while half-duplex systems only allow communication in a single direction at a time. Usually the terms "full-duplex" and "half-duplex" are used to describe point-to-point systems, but in this description they are extended to multi-point systems composed of multiple connected entities or devices that communicate with each other. Therefore in this work, "full-duplex" means a device 11 or BS 10 can both transmit and receive data on the wireless channel simultaneously. Depending on the network configuration whether the full-duplex mode is supported by the devices or not, the proposed scheme for the distributed device detection and resource allocation is differentiates in two cases.

Figure 4:
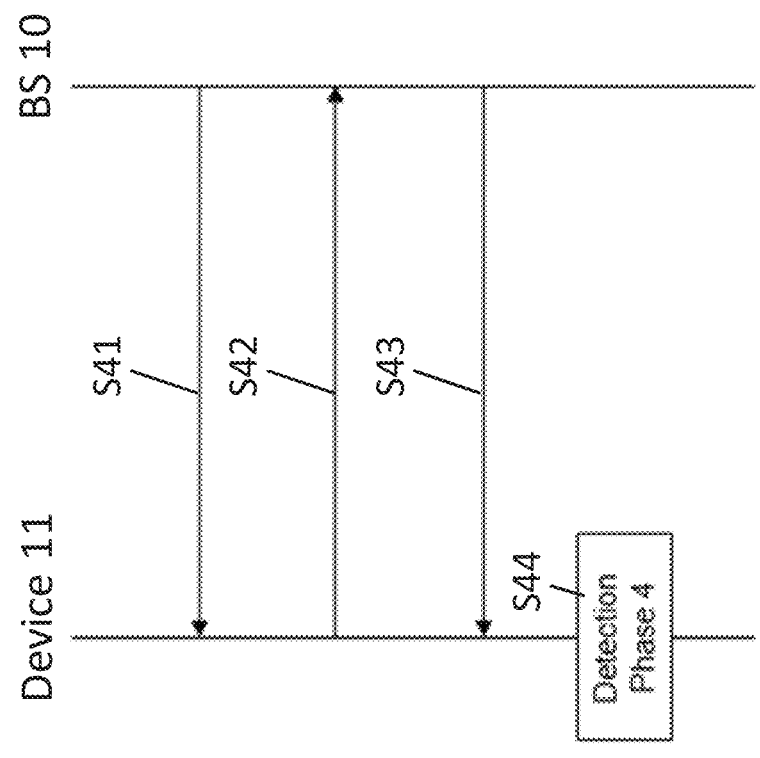
FIG. 4 shows a flow chart example of various steps performed in various phases of the present disclosure in a full-duplex case.

If the full-duplex mode is supported, the proposed scheme mainly consists of four phases, which are schematically illustrated in FIGS. 3A, 3B, 3C and 3D and in the flow chart of FIG. 4 (full-duplex case).

FIG. 3A: Phase 1 (Clustering):

As the devices 11 are partitioned into clusters C1, C2, C3 and the devices 11 in each cluster C1, C2, C3 are respectively designed to obtain a unique compressed signature (i.e. a unique cluster signature), all these relevant information is informed to the devices 11 and updated periodically by the BS 10. The information includes the cluster identifications, the device identifications identifying the devices in each cluster, the ranking information regarding the resource access ranking of the devices, and the compressed signatures, respectively distributed to each of the clusters (Step S41). There is only a single compressed signature in each cluster C1, C2, C3 and only this unique signature is issued to all devices 11 in the respective cluster C1, C2, C3.

FIG. 3B: Phase 2 (Signal Acquisition):

Once devices switch into an active state and start accessing to the network, they transmit simultaneously the compressed signatures to the respective BS 10 and the other active devices 11 in the same cluster (full-duplex) or to the respective BS 10 and a head communication device 12 (half duplex) to indicate their active status to the network. With full-duplex transceivers, all the devices 11 and the BS 10 receive individual linear combinations of the transmitted signatures.

FIG. 3C: Phase 3 (Decoding at BS 10):

The BS 10 detects the active clusters, the number of active devices of each cluster C1, C2, C3, as well as the collision patterns with collision information regarding the interference of the received compressed signatures. Then it broadcasts this information to the devices 11 and assigns a certain amount of resources to each of the active clusters accordingly (Step S43). The information can also be multicast by the BS 10 to the active devices in those detected active clusters by indicating the detected cluster IDs.

FIG. 3D: Phase 4 (Decoding at Devices):

Each active device performs device detection for its corresponding cluster C1, C2, C3 using its received compressed signatures and the broadcast information from the BS 10 in Phase 3. Then it detects its ranking among all the active devices in the cluster and accesses the corresponding resource assigned by the BS 10 for transmission (Step S44).

For illustration, it is assumed that 100 devices 11 are deployed in the network i.e. the wireless communication system, indexed from 1 to 100. Then every 10 of them are partitioned into a cluster C1, C2, C3, which formulates 10 clusters of size 10. And the devices 11 in each cluster C1, C2, C3 are ranked according to the order of their index. And the unique compressed signatures used by the devices 11 in each cluster C1, C2, C3 are notified by the BS 10 during the initial device registration to the network. At a certain time instant, for example, device 4 and 9 from cluster C1 and device 26 and 29 from cluster C3 are triggered and become active. Then they start transmitting their compressed signatures to indicate their active status, and each device requests one resource block for transmission. With full-duplex transceivers, both the BS 10 and the devices receive linear combinations of the transmitted compressed signatures by the active devices (Step S42). Then the BS 10 is able to detect cluster C1 and C3 as the active clusters, with each having 2 active devices. Then this information is broadcasted to the active devices in cluster C1 and C3 and assigns 2 resource blocks for cluster C1 and C3 respectively (Step S43). Upon receiving the broadcast messages, the active devices perform device detection using their own received compressed signatures (Step S44). For example, device 4 in cluster C1 detects that both device 9 and itself are active in its cluster. Since it has a higher rank as its index is smaller, it access the first resource block assigned by the BS 10 to cluster C1 for transmission, while device 9 takes the second one. The same approach also applies for device 26 and 29. In this way, the BS 10 assigns a certain amount of resource blocks to the detected active clusters based on the detected number of active devices in each cluster, and the active devices access the corresponding resources based on the device detection of their own clusters.

However, if full-duplex operations are not supported by the devices 11, and the half-duplex case applies, then a cluster head i.e. a head communication device 12 is defined, in advance for each of the clusters C1, C2, C3. The cluster heads are selected with the property not to transmit concurrently with the other devices in the same cluster. Alternatively, if one of the devices 11 in the cluster C1, C2, C3 supports full-duplex transmissions, it can be assigned as the cluster head 12 for its cluster C1, C2, C3. The cluster heads are supposed to know the cluster structures as well as the estimated channel information from the cluster members to themselves.

Figure 5:
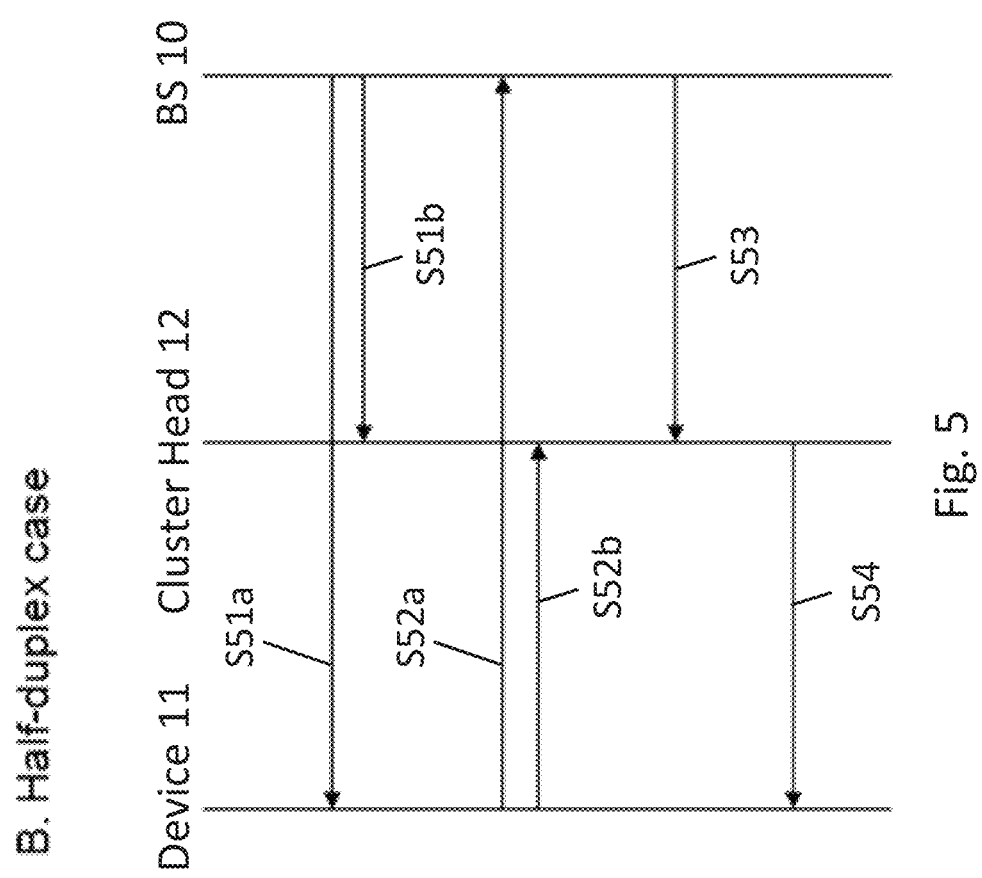
FIG. 5 shows a schematic flow charge of various phases performed by the present disclosure in a half-duplex case.

To this end, the proposed scheme under the non-full-duplex (i.e. half duplex) assumption performs the procedure as follows (and as shown in FIG. 5). At first the cluster information including the cluster head identifications and the information mentioned in Phase 1 under the full-duplex assumption is informed to the devices 11 and the cluster heads 12 by the BS 10 during the device registration (Step S51a, S51b). Thereafter in the signal acquisition phase, after the active devices transmit their individual signatures to indicate their active status, the cluster heads 12 collect their own measurements, which are the linear combinations of the transmitted signatures (Step 52a, 52b). Decoding procedure at the BS side is same as Phase 3 under the full-duplex assumption (Step S53). Afterwards, the cluster heads of the active clusters perform device detection for their corresponding clusters C1, C2, C3 and detect the ranking of the active devices in their clusters using the same decoding algorithms as proposed for Phase 4 under the full-duplex assumption. Then the cluster head 12 broadcasts, multicasts or unicasts the decoded ranking information of the active devices to the rest of active devices in the cluster (Step 54), and those active devices access the corresponding resources for transmission based on their ranking afterwards.

Optionally, each cluster C1, C2, C3 could have multiple cluster heads 12 and all the devices 11 can be regarded as cluster heads for their corresponding clusters. Then they perform all the decoding procedure as described above. Only the non-active device which has a predefined highest ranking in the cluster broadcasts its decoded information to the rest of the devices in its cluster in the last step (Step 54).

In the next sections, details about the proposed algorithms for signature design (i.e. design of the unique cluster signatures), and the decoding procedure at the BS and at the devices, respectively are described.

Consider an M2M network with N devices, which are partitioned in advance into L clusters of equal sized according to some pre-defined criteria (N, L and d are natural numbers). As defined previously, the twofold sparsity among the devices, namely the block sparsity and in-block sparsity, are $K_B$ and $K_I$, respectively. That is, only $K_B$ out of L clusters are active, and the number of active devices in each cluster is at most $K_I$. In addition, $S_B$ is denoted as the block support, which is defined to be the set of index of the active clusters. Similarly, $S_{I,l}$ is denoted as the in-block support, indicating the set of indices of the active devices in cluster 1. Since the activation pattern of the devices is $K_B$ block sparse and $K_I$ in-block sparse, we have the cardinality of the sets $|S_B|=K_B$ and $|S_{I,l}|\leq K_I$ for all the clusters C1, C2, C3.

Therefore, the total number of active devices in the network is $K \leq K_B K_I$. Due to the sparse nature of the event occurrence in MTC, $K<<N$. Herein, a K-sparse binary sequence x of length N to model the activation pattern of the devices 11, with entry "1" indicating the corresponding device to be active and "0" otherwise. Furthermore, $x_l$, $l \in \{1, \ldots, L\}$ is denoted as the status vector for cluster l. Thus, the activation pattern of the devices is formulated as a particular block sparse signal—with additional in-block structure—in the CS based applications.

Figure 9:
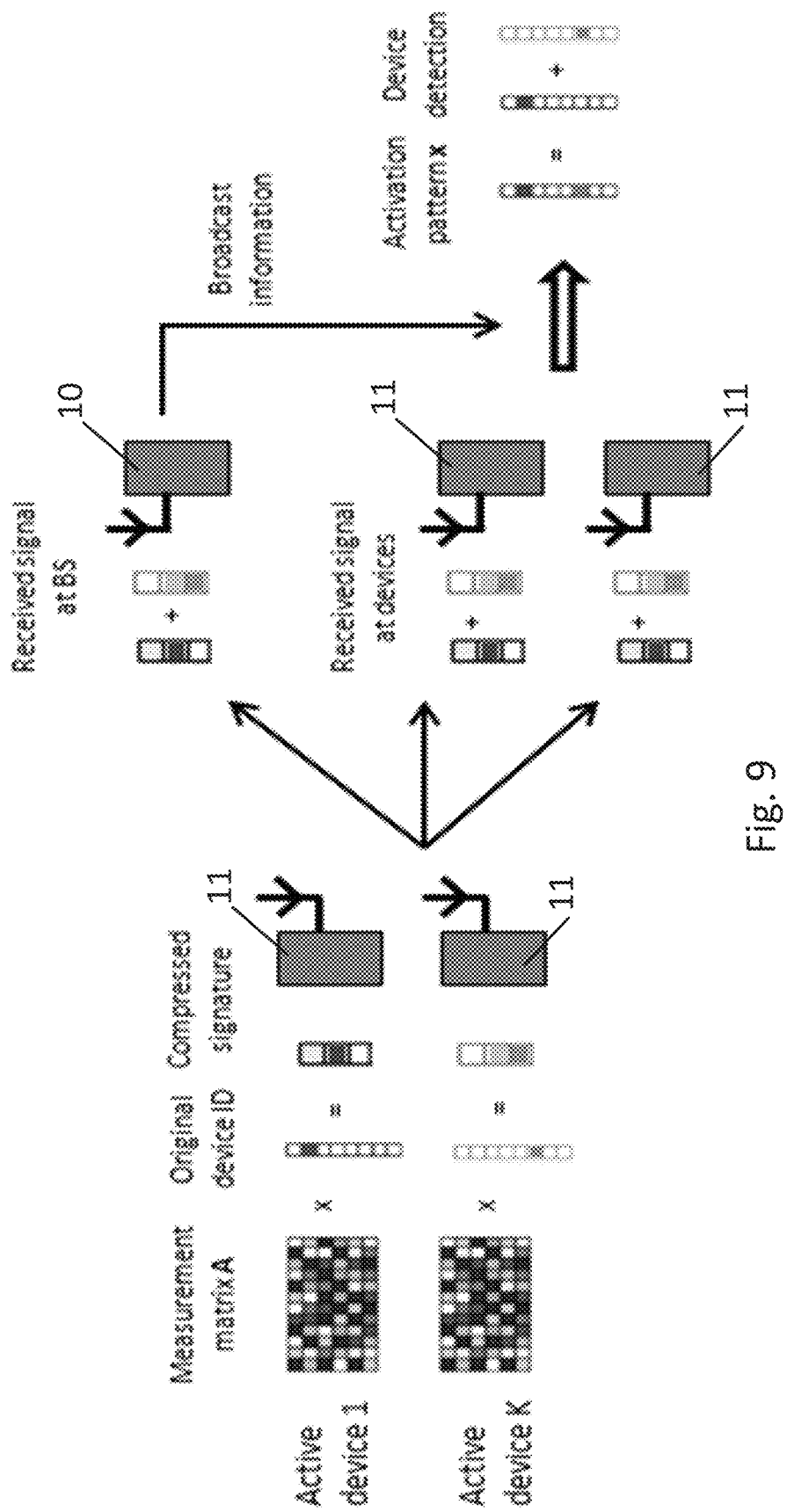
FIG. 9 shows a schematic visualization of a scenario for the generation and detection of unique cluster signatures of the present disclosure.

The CS related techniques are applied in the proposed distributed device detection and resource allocation scheme to reconstruct the K-sparse vector x. The transmission scenario and the target problem can be modeled into a CS based application as illustrated in FIG. 9, where the detailed algorithms will be introduced in the Sections. "Block Support Recovery at BS" and "In-block Support Recovery at Devices."

First, each of the active devices transmits a specially designed compressed signature to the network to indicate its active status, which corresponds to a certain column of the measurement matrix A in the CS theory. The compressed signatures transmitted by the active devices get superimposed in the wireless channel, and both the BS 10 and the devices collect a linear combination of the transmitted signatures. First, the BS 10 detects the active clusters $S_B$ as well as the number of active devices in each cluster $|S_{I,l}|$. Then it broadcasts this information to the devices and assigns a certain amount of resources to the detected clusters accordingly. Afterwards, the active devices use the broadcast information by the BS and their own received compressed signatures to perform the device detection in a distributed manner, and the activation pattern x of the devices can be eventually recovered using the proposed scheme. Then each of the active devices has knowledge of all the active devices $S_{I,l}$ in its cluster and accesses the corresponding assigned resource block based on its ranking in the cluster.

Herein, the object of interest is to perform block support recovery at the BS and the in-block support recovery at the device side. To be specific, the goal is to obtain an accurate estimate of $S_B$ and $|S_{I,l}|$ for all the clusters at the BS, and thereafter, an accurate estimate of $S_{I,l}$ at the device side for each of the clusters.

Signature Design

The CS theory is applied to the transmissions incurred by the devices 11 in the network. To this end, the measurement matrix A of size M×N is introduced, each column of which, say column i denoted by $\alpha_i$, corresponds to the compressed signature sent by the i-th device if it is active. Denoted by $\Gamma(R, T, L, d, \alpha)$ is a particular distribution over matrices having RT rows and Ld columns, and the measurement matrix A is a structured random matrix drawn from this distribution, i.e., $A \sim \Gamma(R, T, L, d, \alpha)$.

Figure 10:
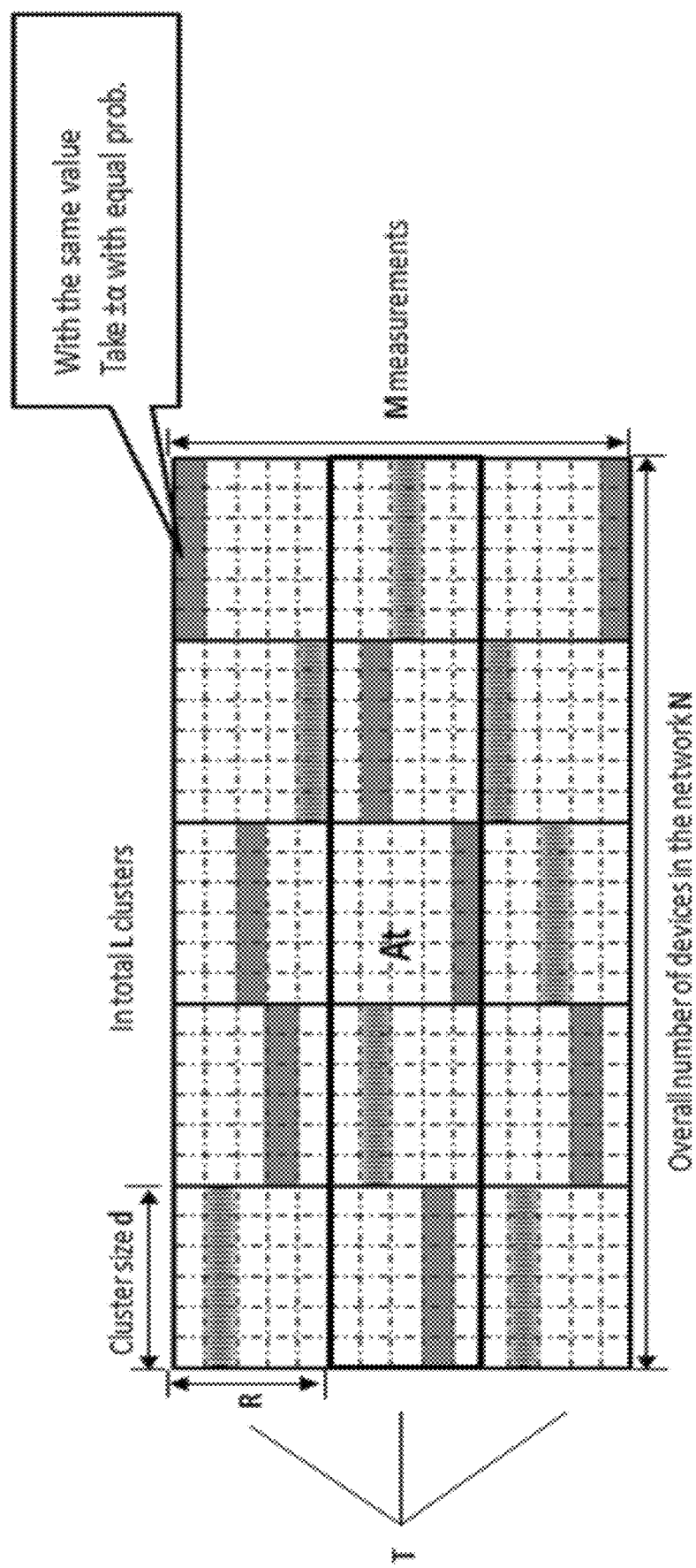
FIG. 10 shows a schematic example of the structure of a measurement matrix.

As illustrated in FIG. 10, the measurement matrix A is composed of the vertical concatenation of T individual random matrices, denoted as $A_t$ for $t \in \{1, \ldots, T\}$. Meanwhile, each $A_t$ consists the horizontal concatenation of L sub-matrices $A_{t,l}$ for $l \in \{1, \ldots, L\}$. Each $A_{t,l}$ a sparse matrix containing exactly d non-zero components—located on the same row and with the same value. The index of the row with non-zero elements is chosen uniformly at random from the set $\{1, \ldots, R\}$, and the non-zero component takes the value of $\pm \alpha$ with probability ½.

For a given realization of $A_{t,l}$, let $h_{t,l} \in \{1, \ldots R\}$ denote the index of the row of $A_{t,l}$ with non-zero entries, and $s_{t,l} \in \{-\alpha, +\alpha\}$ be the corresponding value of the non-zero components in $A_{t,l}$.

To this end, each of the compressed signatures transmitted by the devices, which is the corresponding column of the structured measurement matrix A, is a sparse sequence of length M with sparsity level T.

Block Support Recovery at BS 10

As mentioned previously, the decoding procedure at the BS side aims to detect the number of active clusters and the number of active devices in each cluster, which is to obtain an accurate estimation of the block support $S_B$ and the cardinality of the in-block support $|S_{I,l}|$ for all the active clusters.

Denote $H_B$ as the channel matrix between the devices and the BS, and $\zeta$ as the thermal noise vector. Then the signal/measurements y received by the BS at some given time instant is given by $$y = AHBx + \zeta \qquad (1)$$

For illustration, suppose that the measurements are collected with noise-free transmissions $y = AH_B x$. Since the channel knowledge $H_B$ is assumed to be known at the devices, we take, for instance, the pseudo inverse of the channel matrix $H_B^+$ at the transmitter side. Then the obtained measurements at the BS are given as $$y = AHBHB^+x = Ax \qquad (2)$$

The Count-Sketch procedure is extended to realize the decoding process at the BS, which is implemented as follows.

Denote $y_t$ as the subvector of y corresponding to measurements obtained via the submatrix $A_t$, i.e, $y_t=A_t x$, for $t \in \{1, \ldots, T\}$. For each t, the signal estimates $\tilde{x}_t$ are formed by indexing and scaling the entries of the corresponding observations $y_t$, which is formulated as $\tilde{x}_t = A_t^T y_t$. Recall that each $A_t$ consists the horizontal concatenation of L submatrices $A_{t,l}$, which are sparse matrices containing d non-zero components located on the same row $h_{t,l}$ and with the same value $s_{t,l}$. Then the individual entries of $\tilde{x}_t$ are given as $\tilde{x}_{t,i} = s_{t,l} y_{t,h_{t,l}}$ for $i \in \{1, \ldots, N\}$ if device i belongs to the l-th cluster. Thereafter, a signal estimate $\hat{x}_i$ is formed whose entries are given $$\hat{x}_i = \text{median}\{\tilde{x}_{t,i}\}_{t=1}^T, \text{ for } i \in \{1, \ldots N\} \quad (3)$$

In other words, each entry of the signal estimate is obtained as the median of the corresponding entries of the estimate $\tilde{x}_t$. Similarly, the block-wise estimate $\bar{x}_l$ can be obtained as $$\bar{x}_l = \text{median}\{\hat{x}_i\}_{i=dl-d+1}^{dl}, \text{ for } l \in \{1, \ldots L\} \quad (4)$$

For a given $x_i$ from cluster $l \in S_B$, the estimate $\tilde{x}_{t,i}$ corresponds exactly to the signals from cluster l whenever $h_{t,l}$ is distinct from $h_{t,\bar{l}}$, for all $\bar{l} \in S_B \setminus l$. Conditioned on this, $$\tilde{x}_{t,i} = s_{t,l} y_{t,h_{t,l}} = s_{t,l}(\Sigma_{i=1}^d s_{t,l} x_i) = s_{t,l}^2 (\Sigma_{i=1}^d x_i) = \alpha^2 |S_{l,l}| \quad (5)$$

where the second step follows from the structure of $A_{t,l}$ with equal non-zero elements on the same row, and the last step follows since $x_i \in \{0, 1\}$ is drawn from a binary ensemble.

By taking the median value block-wisely among all individual estimations as in (4), each of the estimates $\bar{x}_l$ from the l-th cluster corresponds to $|S_{l,l}|$—the ultimate goal for block support recovery at the BS. Furthermore, the size of the in-block support set $|S_{l,l}|$ can be obtained as $$|S_{l,l}| = \left[\frac{1}{\alpha^2} \bar{x}_l\right], \text{ for } l \in \{1, \ldots, L\} \quad (6)$$

Therefore, since $|S_{l,l}|$ indicates the number of active devices in cluster l, those clusters with $|S_{l,l}| > 0$ are marked as "active" and detected by the BS 10. Besides, if an individual estimate $\hat{x}_i$ is much larger than the block-wise estimate $\bar{x}_l$, i.e., $\hat{x}_i \gg \bar{x}_l$, it indicates the corresponding measurement with index i suffers strong interference from the other clusters. Thus we mark the measurement as "collided" and keep its index in the collision pattern for the corresponding cluster.

Furthermore, with block sparsity $K_B$, the probability of the conditions for (5) to hold is calculated as $$P(\tilde{x}_{t,i} = \alpha^2 |S_{l,l}|) \geq \frac{R - K_B - 1}{R} \quad (7)$$

By applying the union bound over all the clusters to ensure the conditions for (5), it leads to a requirement of $R = O(K_B)$ and $T = O(\log L)$ to guarantee the reliable block recovery at the BS with overwhelming probability.

After the BS 10 detects the active clusters in the network, the number of active devices in each active cluster (without knowing exactly which one), and the collision patterns in the measurements, it broadcasts this information to the devices and assigns a certain amount of resources to the active clusters accordingly.

In-Block Support Recovery at Devices

During the acquisition phase, either the active devices or the cluster heads also collect their own measurements, which are linear combinations of the compressed signatures transmitted by the active devices. As mentioned previously, with the collected measurements and the broadcast messages by the BS 10 as side information, the devices perform in-block support recovery to detect their order of index among the active devices in the corresponding clusters.

Taking the measurement matrix A for the signature design in Section 7.1 and again assuming noise-free transmissions, the measurements collected at the device side are given by $$y_D = AH_lH_B^+ x = \tilde{A}x \quad (8)$$

where HI is an N×N matrix representing the wireless channels between the devices.

According to the specific structure of the measurement matrix A, an M×d sub-matrix $A_l$ of A is denoted as the set of signatures utilized by the devices from the l-th cluster. Thence, $A_l$ has only T rows with non-zero components, whose index are denoted by the set $D_l$. Thus, in order to perform the in-block support recovery, one needs to focus on $y_{D,l}$—a vector composed of the entries of $y_D$ corresponding to $D_l$. $\tilde{A}_{D,l}$ is denoted as a T×d sub-matrix of $\tilde{A}$ with vertical concatenation of rows corresponding to $D_l$ and columns for cluster l. Therefore, $$y_{D,l} = \tilde{A}_{D,l} x_l \quad (9)$$

With the randomness in $\tilde{A}_{D,l}$ introduced by the wireless channels between the devices, some standard greedy algorithms can be used such as Orthogonal Matching Pursuit, OMP, or Iterative Hard Thresholding, IHT, to perform the in-block support recovery.

Moreover, the algorithm can be further optimised by exploiting the feedback information from the BS 10 on the number of active devices $|S_{l,l}|$ in the cluster and the collision patterns in the collected measurements. On one hand, those collided measurements detected by the BS, which suffer strong interference from the other clusters, can be discarded for more reliable processing. And on the other hand, the number of iterations needed for implementing the greedy algorithms can be limited to $|S_{l,l}|$ since the cardinality of the support is already known, thus leading to significantly reduced computational complexity. The detailed algorithm is summarized in Table 1.

TABLE 1

Extended greedy algorithm for in-block support recovery

Algorithm 1 Extended OMP for In-block Support Recovery
Input: $A_l$, $y_l$, $|S_{l,l}|$, and the collision pattern for block l.
Output: $S_{l,l}$.
  1. Discard the collided measurements in $y_l$ and the corresponding rows in $A_l$ according to the collision pattern. Denote the remaining measurements as $\tilde{y}_l$ and the measurement matrix as $\tilde{A}_l$.
  2. Initialize the residual $r_0 = \tilde{y}_l$, the index set $\Lambda_0 = \emptyset$, the matrix of the chosen atoms $\Phi_0 = \emptyset$, and the iteration counter t = 1.
  3. Choose the column of $\tilde{A}_l$ with index $\lambda_t$ that is best matched to $r_{t-1}$ according to $$\lambda_t = \arg\max_{a_\lambda \in \tilde{A}_l} \| <r_{t-1}, a_\lambda> \|_2.$$

4. Augment the index set $\Lambda_t = \Lambda_{t-1} \cup \{\lambda_t\}$ and the matrix of the chosen atoms $\Phi_t = [\Phi_{t-1} \, a_{\lambda_t}]$.
  5. Solve the least square error minimization problem to obtain a new signal estimate:

TABLE 1-continued

Extended greedy algorithm for in-block support recovery $x_{l,t} = \arg \min_{x_l} \|y_l - \Phi_t x_l\|_2.$ 6. Update the residual as $r_t = \tilde{y}_l - \Phi_t x_{l,t}$.
7. Increment t by 1, and return to Step 2 until $t > |S_{I,l}|$.
8. Return $S_{I,l} = \Lambda_t$.

It has been proven that for a certain random measurement matrix, a K-sparse signal can be reliably reconstructed with the CS methods if the number of measurements M≥cK log N, where c is a constant. For the present specific problem, since the signal of interest is of dimension d and with sparsity level $K_I$, the in-block support can be decoded with high probability if the number of effective measurements satisfies $$T = cK_I \log d = O(K_I \log d) \quad (10)$$

The method described in this disclosure is investigated for distributed device detection and resource allocation in large-scale M2M communication networks. The described method can be widely applied to all kinds of existing M2M devices, without special requirements and limitation on the mobility type, computational capabilities, and etc.

This disclosure utilizes the framework of compressed sensing for distributed detection of the network activation pattern to facilitate efficient resource allocation in the MTC networks, which exploits the correlation in the device behaviors and the sparsity in the activation pattern of the devices. By applying the distributed schemes and the optimization in the algorithms, this disclosure achieves better scalability with the network size and sufficiently reduces the computational complexity, thus leading to more robust performance in the detection process, especially in terms of higher detection probability and reduced access delay.

A preliminary evaluation using the described method was made by the inventors. In the experiment, the number of devices in the network was taken to be N=10000 and they were partitioned into L=100 clusters with equal size d=100. The sparsity level $K = K_B K_I$ was set within the range between 10 and 100. Comparisons were made between the proposed scheme and two classical access schemes, namely the LTE random access procedure and the conventional cluster-based approach where a cluster head aggregates messages/requests for the rest of the devices in the cluster.

It was observed that the scheme of the disclosure significantly outperformed the classical approaches both in terms of detection probability and access delay, thus showing much more reliable performance against the increasing number of devices deployed in the network.

The disclosure is not limited to the specific examples and especially not the communication standard LTE. The disclosure discussed above can be applied to any suitable wireless communication standard and wireless communication system with a base station or and a number of wireless communication devices.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims.

The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. A first communication device for wireless communication in a wireless communication system, wherein said wireless communication system comprises a base station and a plurality of wireless communication devices arranged in clusters, wherein a different cluster signature is assigned to each cluster and one or more wireless communication devices in the cluster, wherein the first wireless communication device is allocated to a first cluster, the first wireless communication device comprising:
    a receiver, configured to receive a first cluster signature assigned to said first cluster from the base station, wherein the wireless communication devices are arranged in clusters based on pre-defined criteria, wherein the pre-defined criteria comprises a sparsity corresponding to a number of active wireless communication devices,
    a memory, configured to store said first cluster signature received from the base station, and
    a transmitter, configured to transmit said first cluster signature in response to the wireless communication device switching into an active state,
    wherein the first wireless communication device is adapted to access resources based on resource allocation information received in response to the transmitter transmitting said first cluster signature.

2. The first wireless communication device according to claim 1,
    wherein the receiver is further configured to receive additional information from the base station, wherein the additional information includes cluster identification information identifying said first cluster, device identification information identifying one or more wireless communication devices in said first cluster, and ranking information regarding resource access ranking of the one or more wireless communication devices in said first cluster.

3. The first wireless communication device according to claim 2, wherein the receiver is further configured to receive said resource allocation information from said base station, wherein said resource allocation information comprises information regarding a total amount of resources allocated for active wireless communication devices in said first cluster, the first wireless communication device further comprising:
    a processor configured to determine the resources to be accessed by the first wireless communication device based on said resource allocation information and said additional information.

4. The first wireless communication device according to claim 3,
    wherein the receiver is further configured to receive a number of active wireless communication devices in said first cluster and collision patterns from the base station, and wherein the processor is further adapted to determine said resources to be accessed by the first wireless communication device based on the resource allocation information, the number of active wireless communication devices in said first cluster, said collision patterns, and said additional information.

5. The first wireless communication device according to claim 4,
wherein the receiver is further configured to receive cluster signatures from other active wireless communication devices in said first cluster, and
wherein the processor is adapted to identify the other active devices in said first cluster based on the number of active wireless communication devices in said first cluster, the collision patterns, the device identification information, and the cluster signatures received from the other active wireless communication devices in said first cluster.

6. The first wireless communication device according to claim 1, wherein the receiver is further configured to:
receive cluster head information from the base station, said cluster head information identifying a wireless communication device in said first cluster as a head communication device, and
receive said resource allocation information from said head communication device, wherein the resource allocation information comprises information about the resources to be accessed by the first wireless communication device.

7. The first communication device according to claim 1, wherein the sparsity comprises one or more of:
a block sparsity corresponding to a number of active clusters; or
an in-block sparsity corresponding to a number of active wireless communication devices in each cluster.

8. A first wireless communication device for wireless communication in a wireless communication system, wherein the wireless communication system comprises a base station and a plurality of wireless communication devices arranged in clusters, wherein a different cluster signature is assigned to each cluster and one or more wireless communication devices in the cluster, wherein the first wireless communication device is allocated to a first cluster as head communication device, the first wireless communication device comprising:
a receiver, configured to receive a first cluster signature assigned to said first cluster and cluster head information from the base station, said cluster head information identifying the first wireless communication device in said first cluster as said head communication device,
a processer, configured to generate resource allocation information in response to cluster signatures received from active wireless communication devices in said first cluster, and
a transmitter, configured to transmit said resource allocation information to said active wireless communication devices in said first cluster,
wherein the wireless communication devices are arranged in clusters based on pre-defined criteria, wherein the pre-defined criteria comprises a sparsity corresponding to a number of active wireless communication devices.

9. The first wireless communication device according to claim 8, wherein said receiver is further configured to receive additional information from the base station, wherein the additional information includes cluster identification information identifying said first cluster, device identification information identifying one or more wireless communication devices in said first cluster, and ranking information regarding resource access ranking of the one or more wireless communication devices in said first cluster.

10. The first wireless communication device according to claim 9,
wherein said receiver is further configured to:
receive cluster signatures from said active wireless communication devices in said first cluster,
receive information regarding a total amount of resources allocated to said active wireless communication devices in said first cluster, and
receive a number of active wireless communication devices in said first cluster and collision patterns from said base station;
wherein the processor is further configured to:
identify the active wireless communication devices in said first cluster based on the cluster signatures, the number of active wireless communication devices in said first cluster, the collision patterns, and the device identification, and
allocate resources to the active wireless communication devices in said first cluster based on the resource allocation information and the ranking information from the base station.

11. The first communication device according to claim 8, wherein the sparsity comprises one or more of:
a block sparsity corresponding to a number of active clusters; or
an in-block sparsity corresponding to a number of active wireless communication devices in each cluster.

12. A base station for wireless communication in a wireless communication system, wherein the wireless communication system comprises the base station and a plurality of wireless communication devices arranged in clusters, the base station comprising:
a processor, configured to generate, for each cluster, a respective cluster signature for the cluster and one or more wireless communication devices in the cluster, and
a transmitter, configured to transmit, for each cluster, the respective cluster signature to the plurality of wireless communication devices in the cluster,
wherein the wireless communication devices are arranged in clusters based on pre-defined criteria, wherein the pre-defined criteria comprises a sparsity corresponding to a number of active wireless communication devices.

13. The base station according to claim 12, wherein the transmitter is further configured to transmit, for each cluster, additional information to the plurality of wireless communication devices in the cluster, wherein the additional information includes cluster identification information identifying the cluster, device identification information identifying the plurality of wireless communication devices in the cluster, and ranking information regarding resource access ranking of the plurality of wireless communication devices in the cluster.

14. The base station according to claim 12, further comprising:
a receiver, configured to receive cluster signatures from wireless communication devices,
wherein the processor is further configured to:
determine, based on the cluster signatures, active clusters, a number of active wireless communication devices in each active cluster, and collision patterns with collision information regarding interference of the cluster signatures, and allocate a total amount of resources for active wireless communication devices in the active clusters, and the transmitter is further configured to transmit resource allocation information regarding the allocated resources, the number of active wireless communication devices in each active cluster, and the collision patterns, wherein the resource allocation information comprises information regarding said total amount of resources for the active wireless communication devices in the active clusters.

15. The base station according to claim 14, wherein:
the transmitter is configured to transmit the resource allocation information, the number of active wireless communication devices in each active cluster, and the collision patterns to the active wireless communication devices in a broadcast transmission.

16. The base station according to claim 14,
wherein one wireless communication device in each cluster is allocated as a head communication device for said cluster,
wherein the transmitter is further configured to:
    transmit cluster signatures, cluster head information to said one head communication device in each cluster, and
    transmit the resource allocation information, the number of active wireless communication devices in each active cluster, and the collision patterns to the head communication devices in each active cluster.

17. The base station according to claim 14, wherein:
the transmitter is configured to transmit the resource allocation information, the number of active wireless communication devices in each active cluster, and the collision patterns to the active wireless communication devices together with cluster identification information in a multicast transmission.

18. The base station according to claim 12, wherein the sparsity comprises one or more of:
    a block sparsity corresponding to a number of active clusters; or
    an in-block sparsity corresponding to a number of active wireless communication devices in each cluster.

19. A method for resource allocation in a wireless communication system, wherein the wireless communication system comprises a base station and a plurality of wireless communication devices arranged in clusters, the method comprising:
    generating, by the base station, a respective cluster signature for the cluster and one or more wireless communication devices in the cluster; and
    transmitting, by the base station, the respective cluster signature to the plurality of wireless communication devices in the cluster,
    wherein the wireless communication devices are arranged in clusters based on pre-defined criteria, wherein the pre-defined criteria comprises a sparsity corresponding to a number of active wireless communication devices.

20. The method for resource allocation in a wireless communication system according to claim 19, wherein the sparsity comprises one or more of:
    a block sparsity corresponding to a number of active clusters; or
    an in-block sparsity corresponding to a number of active wireless communication devices in each cluster.

* * * * *